United States Patent  
Williams

Patent No.: US 9,185,381 B2  
Date of Patent: Nov. 10, 2015

(54) BACKWARD-COMPATIBLE STEREO IMAGE PROCESSING SYSTEM AND METHOD OF GENERATING A BACKWARD-COMPATIBLE STEREO IMAGE

(71) Applicant: Nvidia Corporation, Santa Clara, CA (US)

(72) Inventor: Lance Williams, Santa Clara, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 191 days.

(21) Appl. No.: 14/022,428

(22) Filed: Sep. 10, 2013

(65) Prior Publication Data

US 2015/0070464 A1    Mar. 12, 2015

(51) Int. Cl.  
*G06T 15/00* (2011.01)  
*H04N 13/00* (2006.01)  
*H04N 13/02* (2006.01)

(52) U.S. Cl.  
CPC ......... *H04N 13/0011* (2013.01); *H04N 13/025* (2013.01); *H04N 13/0242* (2013.01)

(58) Field of Classification Search  
None  
See application file for complete search history.

(56) References Cited

U.S. PATENT DOCUMENTS

2012/0162366 A1* 6/2012 Ninan et al. .................... 348/43

* cited by examiner

*Primary Examiner* — Brian P Werner

(57) ABSTRACT

A backward-compatible stereo image processing system and a method of generating a backward-compatible stereo image. One embodiment of the backward-compatible stereo image processing system includes: (1) first and second viewpoints for an image, (2) an intermediate viewpoint for the image, and (3) first and second output channels configured to provide respective images composed of high spatial frequency content of the intermediate viewpoint and respective low spatial frequency content of the first and second viewpoints.

20 Claims, 3 Drawing Sheets

BACKWARD-COMPATIBLE STEREO IMAGE PROCESSING SYSTEM AND METHOD OF GENERATING A BACKWARD-COMPATIBLE STEREO IMAGE

TECHNICAL FIELD

This application is directed, in general, to 3-D imaging and, more specifically, to rendering a stereoscopic image.

BACKGROUND

The human visual system uses a variety of cues to understand a scene, whether real or virtual. One such cue is binocular disparity, which is a depth cue and amounts to the differences in spatial configurations between each of the stereo views. For example, binocular disparity provides for depth perception in a scene. The human visual system recognizes lateral displacement between an object's retinal images in the left and right eye and resolves this disparity as depth. Depth perception is recognized as an important aspect in computer graphics, virtual reality and movies.

Stereoscopic rendering, or simply stereo rendering, is a process by which a scene is rendered from two distinct viewpoints: a left eye viewpoint and a right eye viewpoint, as in normal binocular vision. The resulting stereoscopic image can then be displayed providing the illusion of depth to the viewer. Stereoscopic images may be displayed on a stereo display, where a left eye image is displayed for the left eye, and the right eye image is displayed for the right eye. Alternatively, stereo rendering may be extended to merge or fuse the stereoscopic images together, creating a single three-dimensional (3-D) image. The 3-D image can then be displayed and viewed on a 3-D display using one of several 3-D systems, including anaglyphics, polarization, eclipse systems or other filtering techniques. The 3-D image often cannot be properly viewed through un-aided eyes. Most commercially available systems require the use of special glasses having the appropriate filtering or shutter characteristics to match the display. Otherwise, to the naked eye, the displayed image would appear distorted, or "doubled." Doubled vision occurs when each eye sees both the left- and right-eye images. Certain 3-D display systems are autostereoscopic, meaning that they require no special headgear or glasses.

The display systems mentioned above are all two-dimensional representations that appear 3-D when viewed. Normal binocular vision achieves this through a process known as stereopsis, where the brain resolves the binocular disparity existing between the images perceived by each retina, due to their parallax, resulting in depth perception. Real 3-D displays go a step further, as in volumetric displays, holographic displays and integral imaging. These systems are also autostereoscopic, but display actual 3-D imagery that can be viewed from virtually any aspect without straining the eyes.

SUMMARY

One aspect provides a backward-compatible stereo image processing system. In one embodiment, the system includes: (1) first and second viewpoints for an image, (2) an intermediate viewpoint for the image, and (3) first and second output channels configured to provide respective images composed of high spatial frequency content of the intermediate viewpoint and respective low spatial frequency content of the first and second viewpoints.

Another aspect provides a method of generating a backward-compatible stereo image. In one embodiment, the method includes: (1) receiving left and right views and an intermediate view, (2) preserving low-frequency spatial disparities between the left and right views, (3) suppressing low spatial frequency content of said intermediate view, and (4) forming the backward-compatible stereo image based on high spatial frequency content from the intermediate view and low spatial frequency content from the left and right views.

Yet another aspect provides a stereo image rendering pipeline. In one embodiment, the pipeline includes: (1) left and right low-pass filters configured to suppress respective high spatial frequency content of left and right views of an image, (2) a high-pass filter configured to suppress low spatial frequency content of an intermediate view of the image, (3) left and right combiners respectively configured to composite an output of the high-pass filter with outputs of the left and right low-pass filters to form left and right output channels, and (4) a stereo output channel configured to combine the left and right output channels into a stereo image.

BRIEF DESCRIPTION

Reference is now made to the following descriptions taken in conjunction with the accompanying drawings, in which.

DETAILED DESCRIPTION

Figure 1:
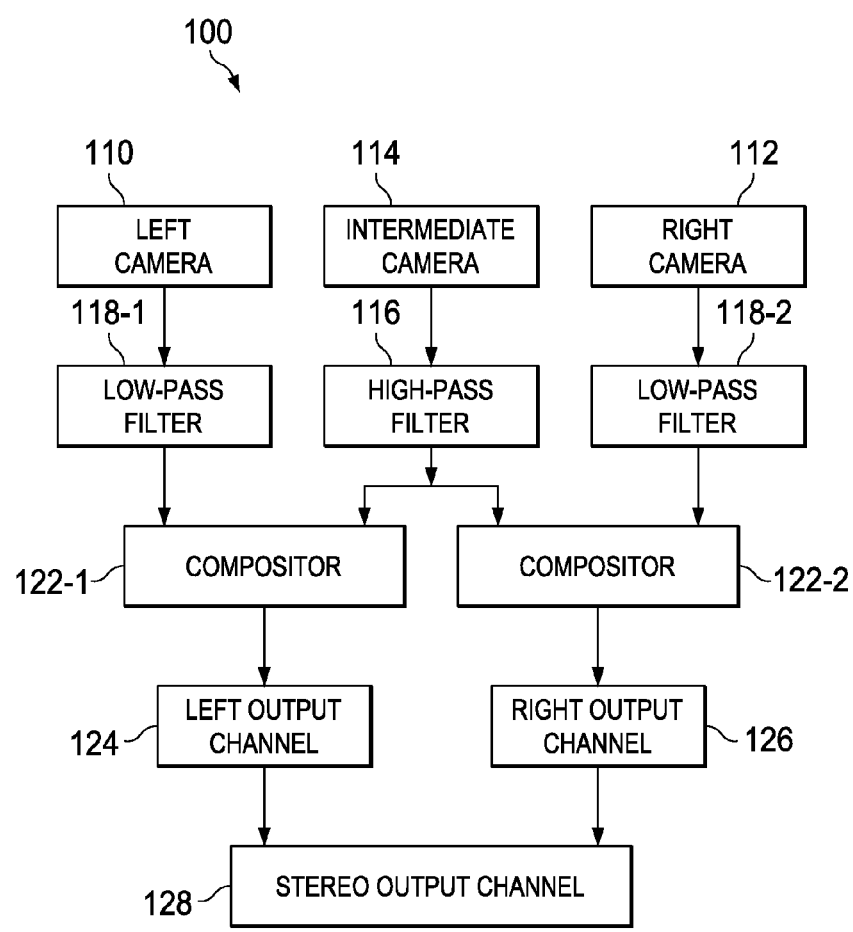
FIG. 1 is a block diagram of one embodiment of a backward-compatible stereo image processing system.

The need for special viewing equipment, such as headgear or glasses, to view a stereo image is a major limitation of stereo, or 3-D content. Viewers without special equipment often perceive distortion in the stereo image due to disparities between the two stereo views. For example, colors appear distorted in anaglyph stereo images viewed by the naked eye. In other systems, the stereo image may appear blurred to the naked eye. Backward-compatible stereo aims to reduce, and perhaps minimize, disparity between stereo views, while preserving sufficient cues for the human visual system to reconstruct the scene in three-dimensions when viewed with special equipment.

It is realized herein that sufficient visual cues and, more specifically, depth information, exist in low spatial frequencies for the human visual system to resolve a stereo image in three-dimensions. This realization flows from the observation that depth-of-field can be increased in a stereo image by focusing the stereo views at slightly different distances. Through stereopsis, the human visual system fuses the two views, suppressing the blurred parts and preserving the correctly focused parts. In other words, high spatial frequencies dominate in the human visual system.

It is realized herein that by preserving the low-frequency spatial disparities between stereo views and suppressing high-frequency spatial disparities, a stereo image can be properly viewed with and without special equipment. It is further realized herein that suppressing high-frequency spatial disparities can be accomplished by sharing the high spatial frequency content of an intermediate, or "central," view between the stereo image components. The intermediate view can be recorded by an additional camera or synthesized from the two stereo views. Preserving low spatial frequency or high spatial frequency content is accomplished by low-pass or high-pass filtering an image. It is realized herein the low-frequency spatial disparities between stereo views are preserved by low-pass filtering, or blurring, each view. Likewise, the high spatial frequency content of the intermediate view is preserved by high-pass filtering. It is further realized herein the stereo views are reconstructed by compositing the low spatial frequency content of one view with the high spatial frequency content of the intermediate view. The same is done for the other view.

There are a variety of techniques available to composite the low spatial frequency content and high spatial frequency content. One such technique is to matte composite the high spatial frequency content over the low spatial frequency content. A much more basic approach is to simply sum the low spatial frequency content and the high spatial frequency content; however, this can introduce quality issues.

Low spatial frequencies include the soft, slowly varying portions of the image, which is essentially the content retained in a blurred image. This is similar to the base tones in audio. Blurring itself, is a low-pass filtering function. For example, taking a lens out of focus effectively performs an optical low-pass filtering function. Low-pass filtering can also be accomplished in the digital domain using, for example, a digital smoothing filter. Smoothing filters typically average a group of nearby pixels to remove sharp edges, transitions and contrast. An alternative is to use a fast Fourier transform (FFT) to translate the image into the frequency domain. Applying a low-pass filter to a view effectively preserves the low spatial frequency content.

High spatial frequencies include those edges, transitions, contrasts and other fine or crisp details that a high-pass filter preserves. A high-pass filter can be accomplished by passing an image through a low-pass filter and subtracting the result from the original image. A variety of high-pass filtering methods are available, including those common in early text copying technology, such as un-sharp masking.

FIG. 1 is a block diagram of one embodiment of a backward-compatible stereo image processing system 100. System 100 includes a left camera 110, a right camera 112 and an intermediate camera 114, and is configured to record a left, right and intermediate view of an image. In certain embodiments, the cameras are physical cameras for recording a live scene. In other embodiments, the cameras are virtual and the left, right and intermediate views are rendered from a left, right and intermediate viewpoint. In alternate embodiments, the intermediate viewpoint is rendered as a composite of the views recorded by left camera 110 and right camera 112. The intermediate view can be synthesized by interpolating the left and right views, referred to as "view interpolation," or by some other technique for combining the left and right views. System 100 also includes a low-pass filter 118-1, a low-pass filter 118-2, a high-pass filter 116, compositors 122-1 and 122-2, a left output channel 124, a right output channel 124 and a stereo output channel 128.

High-pass filter 116 receives the output of intermediate camera 114 and is configured to suppress low spatial frequency content in the intermediate view. High-pass filter 116 preserves high spatial frequency content, including edges and fine details, in the intermediate view. High-pass filter 116 can be formed in a variety of ways. In certain embodiments high-pass filter 116 is formed by low-pass filtering an original image and subtracting the result from the original image.

Continuing the embodiment of FIG. 1, low-pass filter 118-1 and low-pass filter 118-2 respectively receive the outputs of left camera 110 and right camera 112. Low-pass filter 118-1 and low-pass filter 118-2 are configured to suppress high spatial frequency content in the left and right views, including high-frequency spatial disparities between the views. Low spatial frequency content is preserved in the left and right views, including low-frequency spatial disparities between the views. Low-pass filter 118-1 and low-pass filter 118-2 can be formed by a variety of techniques. Optically, low-pass filtering can be achieved by an out-of-focus, or "blurring lens." In alternate embodiments, a digital low-pass filter can be used. For example, a smoothing filter performs the low-pass filtering function by averaging groups of nearby pixels in the image to create a blurred effect.

Compositors 122-1 and 122-2 receive the output from high-pass filter 116 and respective outputs from low-pass filter 118-1 and low-pass filter 118-2. Compositor 122-1 combines the high spatial frequency content of the intermediate view from intermediate camera 114 with the low spatial frequency content of the left view from left camera 110. The resulting combined image, or the "left image," is then provided on left output channel 124. Compositor 122-2 combines the high spatial frequency content of the intermediate view with the low spatial frequency content of the right view from right camera 112. The resulting combined image, or "right image," is then provided on right output channel 126. In certain embodiments, compositors 122-1 and 122-2 are matte compositors configured to employ a spatial frequency dependent alpha blending selectively combine the high spatial frequency content and the low spatial frequency content. In alternate embodiments, other compositing methods can be used to combine low spatial frequency content of the left and right views with the high spatial frequency content of the intermediate view.

The left and right images provided on left output channel 124 and right output channel 126 are combined onto stereo output channel 128. The left and right image exhibit low-frequency spatial disparities preserved by the low-pass filtering by low-pass filter 118-1 and low-pass filter 118-2. High spatial frequency content is shared between the left and right images due to the high-pass filter applied to the intermediate view. The left and right images can be combined by temporally interleaving frames, which is to rapidly alternate the left and right images. Alternatively, one of the images can be superimposed over the other. For example, the image from left output channel 124 can be superimposed onto the image from right output channel 126. The resulting stereo image contains low-frequency stereo cues sufficient to allow the brain of a viewer to resolve the stereo image in three dimensions if using special viewing equipment, such as synchronized shutter glasses. The same stereo image can be viewed without special viewing equipment and have little apparent distortion due to the low-frequency spatial disparities.

Figure 2:
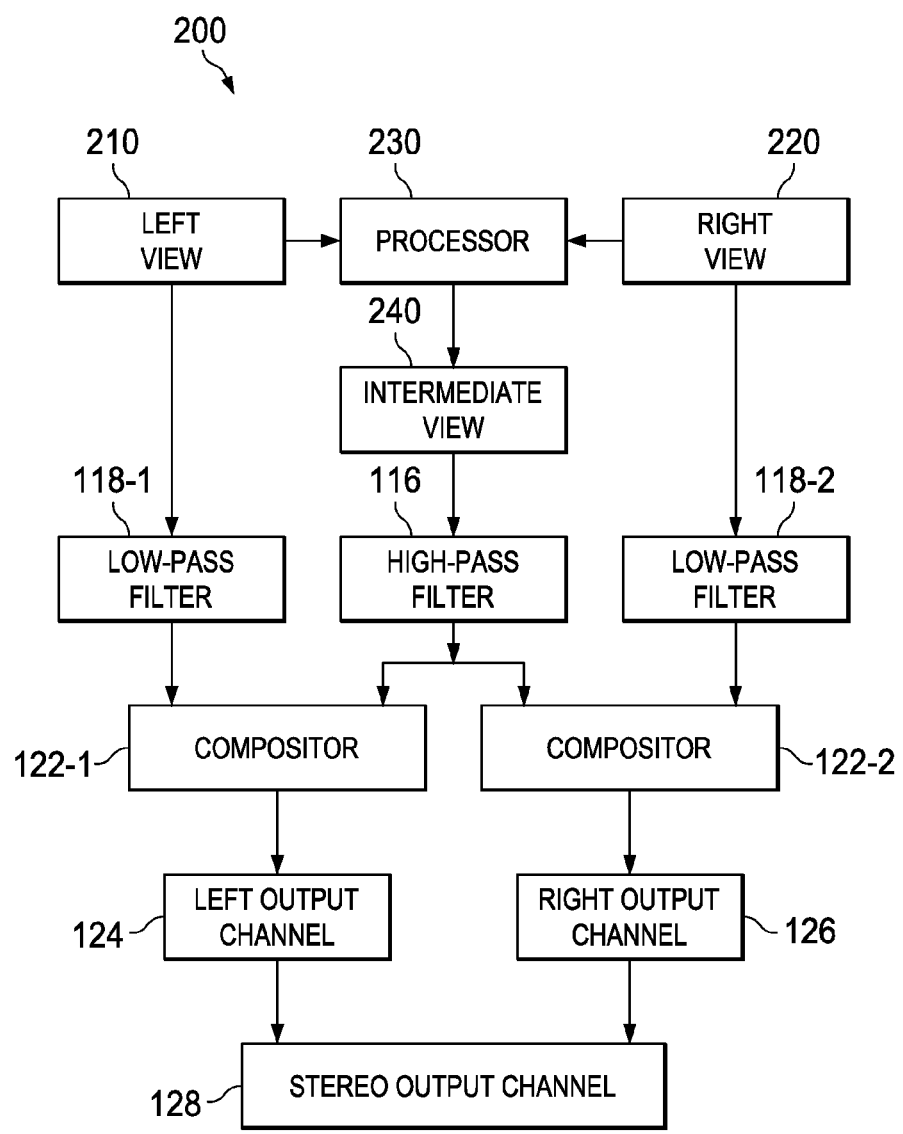
FIG. 2 is a block diagram of another embodiment of a backward-compatible stereo image processing system.

FIG. 2 is a block diagram of another embodiment of a backward-compatible stereo image processing system 200. System 200 includes several components of the embodiment of FIG. 1, in addition to a left view 210, a right view 220, a processor 230 and an intermediate view 240. Left view 210 and right view 220 are used by processor 230 to generate intermediate view 240. In certain embodiments, left view 210 and right view 220 are captured via physical cameras recording a live scene, as in the embodiment of FIG. 1. In alternate embodiments, left view 210 and right view 220 are rendered views of computer generated graphics. Processor 230 synthesizes intermediate view 240 by interpolating left view 210 and right view 220.

As in the embodiment of FIG. 1, left view 210 passes through low-pass filter 118-1, preserving low spatial frequency content present in left view 210. Likewise, right view 220 passes through low-pass filter 118-2, preserving low spatial frequency content present in right view 220. High spatial frequency content of both left view 210 and right view 220 is respectively suppressed by low-pass filter 118-1 and low-pass filter 118-2.

Similarly, intermediate view 240 passes through high-pass filter 116, of FIG. 1, suppressing low spatial frequency content present in intermediate view 240 and preserving high spatial frequency content.

The filtered views are then combined as they were in the embodiment of FIG. 1, ultimately arriving at a backward-compatible stereo image on stereo output channel 128.

Figure 3:
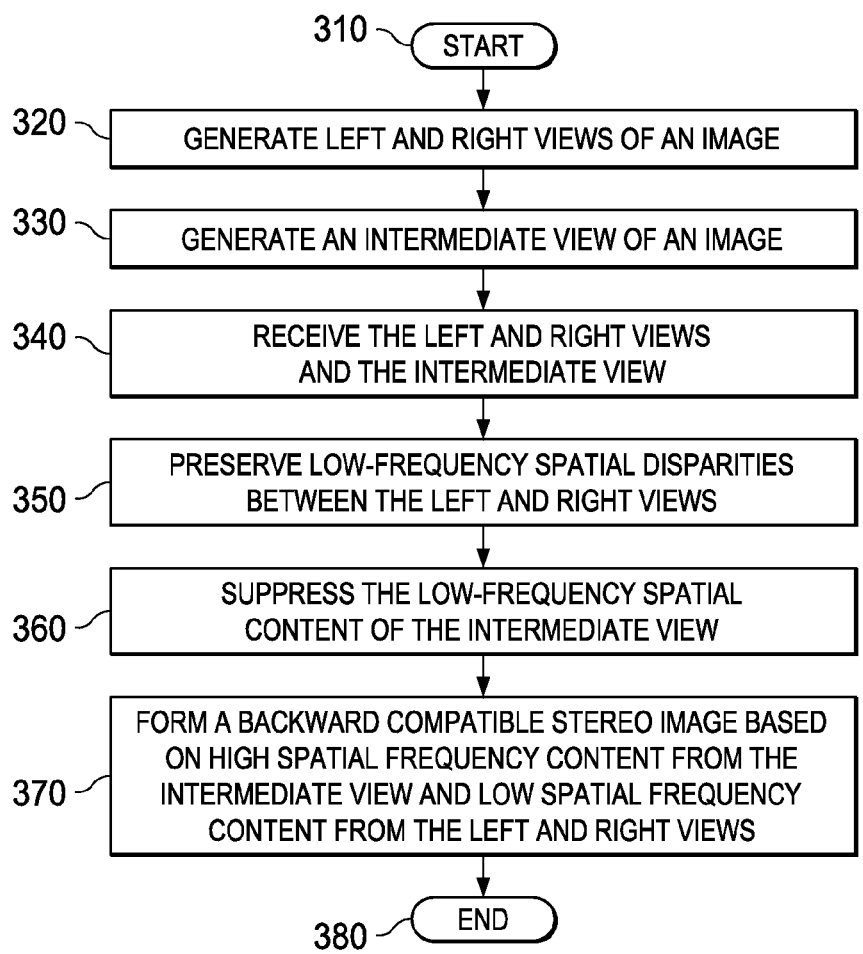
FIG. 3 is a flow diagram of one embodiment of a method of generating a backward-compatible stereo image.

FIG. 3 is a flow diagram of one embodiment of a method for generating a backward-compatible stereo image. The method begins in a start step 310. In a first generation step 320, left and right views of an image are generated. In some embodiments, the left and right views are generated by rendering a computer generated scene from stereo viewpoints. In other embodiments the left and right views are captured by stereo cameras recording a live scene. In the embodiment of FIG. 3, an intermediate view of the image is generated in a second generation step 330. The intermediate view can be recorded by an additional camera, or can be synthesized. In certain embodiments, the intermediate view is synthesized from the left and right views by interpolation. In alternate embodiments, where the left and right views are independent renderings of a computer generated scene, the intermediate view can be rendered from an additional viewpoint, similar to the rendering of the left and right views.

Continuing the embodiment of FIG. 3, the left and right views and the intermediate view are received as inputs to a stereo image processing pipeline in a receiving step 340. In a low-pass filtering step 350 the left and right views are filtered to preserve the low-frequency spatial disparities between the left and right views. Consequently, high spatial frequency content is suppressed. In a high-pass filtering step 360 the intermediate view is filtered to suppress low spatial frequency content and preserve high spatial frequency content.

In a forming step 370, the backward-compatible stereo image is generated based on the preserved content from the left and right views and the intermediate view. The stereo image is a combination of left and right images. The left image is a combination of low spatial frequency content from the left view and the high spatial frequency content from the intermediate view. The same high spatial frequency content is also present in the right view, which combines the high spatial frequency content of the intermediate view and the low spatial frequency content of the right view. The left and right images are combined by temporal interleaving, or rapidly alternating between the left and right images for display. In alternate embodiments the left and right images are combined by superimposing one onto the other and subsequently separating them, for example, by color or polarization, for presentation to each eye. The method ends in an end step 380.

Those skilled in the art to which this application relates will appreciate that other and further additions, deletions, substitutions and modifications may be made to the described embodiments.

What is claimed is:

1. A backward-compatible stereo image processing system, comprising:
   first and second viewpoints for an image;
   an intermediate viewpoint for said image; and
   first and second output channels configured to provide respective images composed of said intermediate viewpoint with low spatial frequency content suppressed and respective low spatial frequency content of said first and second viewpoints.

2. The backward-compatible stereo image processing system recited in claim 1 wherein said intermediate viewpoint is an interpolation of said first and second viewpoints.

3. The backward-compatible stereo image processing system recited in claim 1 wherein said intermediate viewpoint is captured independent of said first and second viewpoints.

4. The backward-compatible stereo image processing system recited in claim 1 further comprising a stereo output channel configured to temporally interleave said first and second output channels.

5. The backward-compatible stereo image processing system recited in claim 1 wherein said first and second viewpoints form a stereo pair for viewing said image in two and three dimensions.

6. The backward-compatible stereo image processing system recited in claim 1 further comprising a filter configured to suppress low spatial frequency content of said intermediate viewpoint.

7. The backward-compatible stereo image processing system recited in claim 1 wherein said respective images are formed by matte compositing said high spatial frequency content of said intermediate viewpoint and said respective low spatial frequency content of said first and second viewpoints.

8. A method of generating a backward-compatible stereo image, comprising:
   receiving left and right views and an intermediate view;
   preserving low-frequency spatial disparities between said left and right views;
   suppressing low spatial frequency content of said intermediate view; and
   forming said backward-compatible stereo image based on high spatial frequency content from said intermediate view and low spatial frequency content from said left and right views.

9. The method recited in claim 8 further comprising rendering said intermediate view as a composite of said left and right views.

10. The method recited in claim 8 wherein said preserving includes low-pass filtering spatial content of said left and right views.

11. The method recited in claim 8 wherein said suppressing includes high-pass filtering spatial content of said intermediate view.

12. The method recited in claim 8 wherein said forming includes generating left and right output channels that are combined into said backward-compatible stereo image.

13. The method recited in claim 12 wherein said forming includes matte compositing said high spatial frequency content from said intermediate view over said low spatial frequency content from said left and right views to form said left and right output channels, respectively.

14. The method recited in claim 12 wherein said forming includes temporally interleaving said left and right output channels.

15. A stereo image rendering pipeline, comprising:
   left and right low-pass filters configured to suppress respective high spatial frequency content of left and right views of an image;
   a high-pass filter configured to suppress low spatial frequency content of an intermediate view of said image;
   left and right combiners respectively configured to composite an output of said high-pass filter with outputs of said left and right low-pass filters to form left and right output channels; and
   a stereo output channel configured to combine said left and right output channels into a stereo image.

16. The stereo image rendering pipeline recited in claim 15 wherein said stereo output channel is further configured to temporally interleave said left and right output channels.

17. The stereo image rendering pipeline recited in claim 15 wherein said left and right views have low- and high-frequency spatial disparities.

18. The stereo image rendering pipeline recited in claim 17 wherein said stereo image preserves low-frequency spatial disparities between said left and right views.

19. The stereo graphics rendering pipeline recited in claim 15 wherein said intermediate view is recorded by a camera independent of said left and right views.

20. The stereo image rendering pipeline recited in claim 15 further comprising a processor configured to generate said intermediate view based on said left and right views.

\* \* \* \* \*